3,219,706
NITROALKYLAMINES

Mortimer J. Kamlet, London, England, and Joseph C. Dacons, Washington, D.C., assignors to the United States of America as represented by the Secretary of the Navy
No Drawing. Filed July 31, 1962, Ser. No. 213,833
8 Claims. (Cl. 260—583)
(Granted under Title 35, U.S. Code (1952), sec. 266)

The invention described herein may be manufactured and used by or for the Government of the United States of America for governmental purposes without the payment of any royalties thereon or therefor.

This invention is generally directed to novel nitroalkylamines and their method of preparation. In particular, the invention is directed to the compound 2,2-dinitroethylamine, its derivatives and preparation of same.

Those concerned with the arts of ordnance and propulsion systems are constantly seeking novel high energy compounds in order to broaden the developmental base thereof.

It is an object of this invention to provide novel high energy compounds.

Another object of this invention is the provision of high energy compounds which find utility as high explosives and propellants and which are useful as monomers in the preparation of energetic polymer systems.

Another object of this invention is the provision of methods of preparing novel high energy compounds.

Novel nitroalkylamines and derivatives

The compounds provided by this invention and their general method of preparation, are as follows:

2,2-dinitroethylamine is prepared by the reaction of methanolic 1,1,1-trinitroethane with anhydrous ammonia.

N,N-dimethyl-2,2-dinitroethylamine is prepared by the reaction of aqueous dimethylamine and 1,1,1-trinitroethane.

Potassium-N-,N-dimethyl-2,2-dinitroethylamine is prepared by the reaction of N,N-dimethyl-2,2-dinitroethylamine with KOH.

2-bromo - 2,2 - dinitroethylammonium bromide is prepared by the bromination of ethereal, 2,2-dinitroethylamine.

Specific embodiments of the novel nitroalkylamines and derivatives thereof within the scope of the invention are illustrated by the following examples:

EXAMPLE I

2,2-dinitroethylamine

A solution of 66 gms. (0.40 mole) 1,1,1-trinitroethane in 500 mls. methanol was prepared and into the thoroughly stirred solution was bubbled anhydrous ammonia with moderate cooling to hold the temperature to about 35–40° C. After three hours the crystalline yellow product was allowed to settle, the supernatant liquor decanted, the product stirred with an additional 100 mls. methanol and filtered. After further washing with methanol and with ether the product was air dried. The yield was 33.9 gms. (63% of theoretical). By applying a vacuum to the mother liquor, to remove dissolved ammonia, an additional 11.9 gms. of product was recovered to bring the total yield up to 85% of theoretical. The product, 2,2-dinitroethylamine, has a M.P. of 117°.

The product is soluble in mineral acids, only slightly soluble in acetone, alcohols or water and insoluble in nonpolar solvents.

EXAMPLE II

2-bromo-2,2-dinitroethylammonium bromide

To a stirred suspension of 2 gms. 2,2-dinitroethylamine in 200 mls. anhydrous ether ($H_2O$—0.01%) was added bromine in a dropwise manner. The product, 2-bromo-2,2-dinitroethylammonium bromide, precipitated in a yield of 3.8 gms. (87% of theoretical) and had a melting point of 128° C. Upon further purification (dissolve in methanol, filter and reprecipitate with ether) the white, powdery product had a melting point of 129.5° C.

EXAMPLE III

2-bromo,2,2-dinitroethylammonium bromide

To a stirred suspension of 2,2-dinitroethylamine in 300 mls. ($H_2O$—0.4%) bromine was added dropwise. The mother liquor was then evaporated and the gummy solid which remained was taken up in ether-pentane, filtered and concentrated to yield 5.77 gms. (34.5% of theoretical) of 2-bromo-2,2-dinitroethylammonium bromide.

EXAMPLE IV

N,N-dimethyl-2,2-dinitroethylamine

A solution of 20 mls. (0.114 mole) of 25% aqueous dimethylamine and 9.29 gms. (0.057 mole) of 1,1,1-trinitroethane was refluxed 5 min. and allowed to stand overnight at room temperature. After filtering and washing with methanol followed by ether the product separated as pale yellow columnar equant crystals in a yield of 5.13 gms. N,N-dimethyl-2,2-dinitroethylamine is soluble in dilute acid or dilute alkali and very slightly soluble in water.

EXAMPLE V

Potassium-N,N-dimethyl-2,2-dinitroethylamine

Two grams of N,N-dimethyl-2,2-dinitroethylamine was dissolved in a solution of 2.0 gms. 85% KOH in 5 mls. water at 70° C. On cooling, 2.02 gms. of potassium-N, N-dimethyl-2,2-dinitroethylamine precipitated as small columnar yellow crystals.

EXAMPLE VI

Method of preparing dipotassium bis(2,2-dinitroethyl)amine

Five gms. (0.037 mole) of 2,2-dinitroethylamine was suspended in 25 mls. water containing equimolar KOH and the suspension was allowed to stand for 3 days at room temperature. The mixture was then cooled to 5° C., filtered, washed with methanol followed by ether and air dried. There was obtained 4.65 gms. of dipotassium bis(2,2-dinitroethyl)amine as bright yellow, elongated platelets.

The compounds illustrated may be utilized per se as high explosives or as components of propulsion systems. In addition, these energetic materials may be used as intermediates in the preparation of energetic monomers as follows:

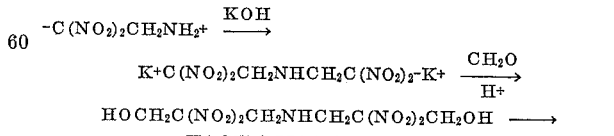

Obviously many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. 2-bromo-2,2-dinitroethylamine bromide.
2. N,N-dimethyl-2,2-dinitroethylamine.
3. Potassium-N,N-dimethyl-2,2-dinitroethylamine.
4. The method of preparing 2,2-dinitroethylamine which comprises reacting 1,1,1-trinitroethane with anhydrous ammonia.
5. The method of preparing 2-bromo-2,2-dinitroethylammonium bromide which comprises reacting an ethereal suspension of 2,2-dinitroethylamine with elemental bromine.
6. The method of preparing dipotassium 2,2,2′,2′-tetranitrodiethylamine which comprises reacting 2,2-dinitroethylamine with an aqueous solution of potassium hydroxide.
7. The method of preparing N,N-dimethyl-2,2-dinitroethylamine which comprises reacting 1,1,1-trinitroethane with aqueous dimethylamine.
8. The method of preparing potassium-N,N-dimethyl-2,2-dinitroethylamine which comprises reacting N,N-dimethyl-2,2-dinitroethylamine with an aqueous solution of potassium hydroxide.

References Cited by the Examiner

UNITED STATES PATENTS 2,731,460   1/1956   Schenck et al. ___ 260—583 XR

OTHER REFERENCES

Kamlet et al.: Jour. of Organic Chemistry, vol. 26, (1961), pages 3005–8.

CHARLES B. PARKER, *Primary Examiner.*